(12) United States Patent
Turner et al.

(10) Patent No.: US 7,426,901 B2
(45) Date of Patent: *Sep. 23, 2008

(54) ANIMAL FEEDING DEVICE AND METHOD

(76) Inventors: Robert Michael Turner, 14412 Kings Crossing Blvd., Boyds, MD (US) 20841; Mark Douglas Olcott, 20459 Sunbright La., Germantown, MD (US) 20874

(*) Notice: Subject to any disclaimer, the term of this patent is extended or adjusted under 35 U.S.C. 154(b) by 0 days.

This patent is subject to a terminal disclaimer.

(21) Appl. No.: 11/785,246

(22) Filed: Apr. 16, 2007

(65) Prior Publication Data

US 2007/0193524 A1 Aug. 23, 2007

(51) Int. Cl.
*A01K 5/01* (2006.01)
(52) U.S. Cl. ...................... 119/51.02; 119/62
(58) Field of Classification Search .............. 119/51.02, 119/62, 52.4, 63, 52.1, 51.11, 52.3, 51.12, 119/57.9, 59
See application file for complete search history.

(56) References Cited

U.S. PATENT DOCUMENTS

| | | | |
|---|---|---|---|
| 3,541,995 A | 11/1970 | Fauthauer |
| 3,557,757 A | 1/1971 | Brooks |
| 3,897,753 A | 8/1975 | Lee et al. |
| 3,954,086 A | 5/1976 | Maness |
| 3,985,104 A | 10/1976 | Klimer |
| 4,036,178 A | 7/1977 | Lee et al. |
| 4,049,950 A | 9/1977 | Byrne et al. |
| 4,077,527 A | 3/1978 | Fryer et al. |
| 4,085,870 A | 4/1978 | Von Holdt |
| 4,129,855 A | 12/1978 | Rodrian |
| 4,173,099 A | 11/1979 | Robb |
| 4,422,409 A | 12/1983 | Walker et al. |
| 4,461,241 A | 7/1984 | Ostler |
| 4,463,706 A | 8/1984 | Meister et al. |
| 4,475,481 A | 10/1984 | Carroll |
| 4,517,923 A | 5/1985 | Palmer |
| 4,532,892 A | 8/1985 | Kuzara |
| 4,655,170 A | 4/1987 | DaSilva |
| 4,782,790 A | 11/1988 | Batson |
| 4,969,292 A | 11/1990 | Reid et al. |
| D320,291 S | 9/1991 | Dalton, Jr. |
| 5,088,447 A | 2/1992 | Spencer et al. |
| 5,176,103 A | 1/1993 | Reid et al. |
| 5,200,891 A | 4/1993 | Kehr et al. |
| D339,429 S | 9/1993 | Reid et al. |

(Continued)

OTHER PUBLICATIONS

International Search report mailed Mar. 13, 2007 in corresponding International Application No. PCT/US05/09255.

(Continued)

*Primary Examiner*—Yvonne R. Abbott
(74) *Attorney, Agent, or Firm*—Staas & Halsey LLP

(57) ABSTRACT

An automated feeding system for pets with special diets includes a feeder dish which is made accessible to a pet only when an ID tag on the pet is recognized as authorized by a receiver on the device and only for a certain time period. The appropriate amount of food is thereby made available at appropriate time intervals. If a plurality of tags is pre-programmed as authorized, each animal's tag can sequentially activate the feeding device to feed each animal, respectively. However, if more than one authorized tag is present in the feeding time set for one animal, the drawer closes.

32 Claims, 7 Drawing Sheets

U.S. PATENT DOCUMENTS

| | | | |
|---|---|---|---|
| 5,299,529 | A | 4/1994 | Ramirez |
| 5,309,864 | A | 5/1994 | Harmsen et al. |
| 5,314,243 | A | 5/1994 | McDonald et al. |
| 5,351,645 | A | 10/1994 | Brennon |
| 5,469,659 | A | 11/1995 | Reid et al. |
| 5,570,655 | A | 11/1996 | Targa |
| 5,669,328 | A | 9/1997 | Lanfranchi |
| 5,701,702 | A | 12/1997 | Reid et al. |
| 5,878,402 | A | 3/1999 | Brewster et al. |
| 6,044,795 | A | 4/2000 | Matsuura et al. |
| 6,349,671 | B1 | 2/2002 | Lewis et al. |
| 6,446,574 | B2 | 9/2002 | Bickley |
| 6,487,987 | B1 | 12/2002 | Choi |
| D468,836 | S | 1/2003 | McFee |
| 6,615,764 | B2 | 9/2003 | Voogd et al. |
| 6,651,585 | B2 | 11/2003 | van den Berg |
| 6,651,592 | B2 * | 11/2003 | Maddox et al. ............. 119/720 |
| 6,823,818 | B2 | 11/2004 | van den Berg et al. |
| 6,928,955 | B1 | 8/2005 | Rokos |
| 7,051,675 | B1 | 5/2006 | Mayer et al. |
| 7,055,462 | B2 | 6/2006 | Keller |
| 7,124,707 | B1 | 10/2006 | Clarke |
| 7,152,550 | B2 | 12/2006 | Walker |
| 2002/0096120 | A1 | 7/2002 | Busha |
| 2002/0134313 | A1 | 9/2002 | King et al. |
| 2003/0070622 | A1 | 4/2003 | Vaags |
| 2004/0103848 | A1 | 6/2004 | van den Berg |
| 2004/0194714 | A1 | 10/2004 | Lee |
| 2005/0061252 | A1 | 3/2005 | Meeks et al. |
| 2005/0252622 | A1 | 11/2005 | Reid |
| 2005/0281648 | A1 | 12/2005 | Hockenyos et al. |
| 2006/0000418 | A1 | 1/2006 | Kubala et al. |
| 2006/0042549 | A1 | 3/2006 | Bauman |
| 2006/0096545 | A1 | 5/2006 | Cone et al. |
| 2007/0044723 | A1 * | 3/2007 | Anderbery ............... 119/51.02 |

OTHER PUBLICATIONS

Written Opinion mailed Mar. 13, 2007 in corresponding International Application No. PCT/US05/09255.

Collection of pet feeding devices, 8 pp., date unknown.

Texas Instruments web pages regarding RFID products, 8 pp., Feb. 28, 2005.

"www.furryfeeder.com", webpages dated Jan. 18, 2005 (seven pages).

"Neko Feeder", www.nekofeeder.com/WhatdoesNekoFeederdo.htm, 30pp.

U.S. Appl. No. 11/084,203, filed Mar. 21, 2005, Robert M. Turner et al.

* cited by examiner

ANIMAL FEEDING DEVICE AND METHOD

CROSS REFERENCE TO RELATED APPLICATION

This application claims the benefit under 35 U.S.C. Section 119(e) of U.S. Provisional Patent Application Ser. No. 60/554,799, filed Mar. 22, 2004, and under 35 U.S.C. § 120 of U.S. patent application Ser. No. 11/084,203, filed Mar. 21, 2005, now allowed, which are hereby incorporated by reference in their entireties into this application.

BACKGROUND OF THE INVENTION

1. Field of the Invention

This invention relates to animal feeding and, more particularly, to an automatic device and method for identifying specific pets for the purposes of allowing or disallowing feedings, and maintaining animal-specific diets and feeding schedules.

2. Description of the Related Art

Some animals are restricted to certain diets for health reasons. However, it is often inconvenient based on the pet owner's schedule to accommodate the dietary needs of the animal. This is particularly true when the pet owner has more than one pet, each requiring different dietary needs. Also, animals can overheat if large amounts of food are simply made available and the animal tends to overeat.

It is desired to have a system that automatically replenishes an animal's food so that the animal can be repeatedly fed without the need for the pet owner being present.

It is also desired that the food be available to the animal only during its feeding time, to avoid other animals being interested in eating the food, and to prevent young children present in the household from playing with and/or eating the pet's food.

It is also desirable for the pet owner that the pet be able to determine its own feeding time by "requesting" access to the food, but said access is only given within a controlled schedule set by the pet owner.

It is further desired by pet owners with difficult working hours and/or with multiple pets to have a more convenient and reliable manner of controlling the feeding of the animal(s) with less personal intervention/responsibility.

Also, sometimes a pet owner has only one pet or otherwise cares for only one pet, and doesn't want its food accessed by other animals. For example, someone who cares for a barn cat may want to offer food thereto, but prevent birds, mice, etc., from having access to the food.

Further, any such pet feeding device must be convenient to use and healthy for the pet.

Various types of "automatic" animal feeding devices are known in the art. They generally rely upon timer mechanisms that are programmed to operate on a 24 hour timetable. When a predetermined elapsed time or specific "clock" time is met, the animal is simply allowed access to the food. Others do not rely on a timer, but allow a bulk storage device to automatically fill a completely exposed bowl by gravity feed or similar method.

Other systems are known wherein the availability of the food is dictated by the presence of the pet at the feeding device. More particularly, as described in Targa's U.S. Pat. No. 5,570,655 (Col 1, lines 28-52), the early work of Lee et al. (see U.S. Pat. Nos. 3,897,753 and 4,036,178) relates to a rather complex control system that generates an electric field around an open food receptacle. An animal wearing a special collar that is provided with a conductive portion to alter the electric field signals to the system that the proper animal is near, thereby disabling a shock or other signal generating device. In the converse situation, if an animal not wearing the special collar reaches over the lip of the receptacle, and makes contact with the metallic strip, it receives a shock, thereby frightening the animal away from the receptacle. Instead of the conductive collar, the device can rely on radio frequency ("RF") technology. In an alternate embodiment, identifying the presence of a "tagged" animal can activate a hopper to fill a food receptacle.

While the Lee et al. system appears to have the ability to distinguish between those animals entitled to access and those who are not, the system is unreasonably complex. In addition, the fact that this system administers a shock to repel an animal may be deemed to be inhumane. Further, as the food is always exposed in the dish, this creates the risk that small children in the household will play with or eat the pet's food, as discussed by Lewis et al., U.S. Pat. No. 6,349,671, Col. 10, lines 52-56.

Targa, supra, seeks to overcome the complexity of the Lee et al. devices by providing a dish that includes reed switches which cause an alarm to sound if a pet without a special collar seeks to feed from the dish. Again, the dish is always exposed, and the device has no ability to distinguish between pets as to the amount or time for feeding. Also, there is no way to automatically replenish food in the dish.

Lanfranchi, U.S. Pat. No. 5,669,328, provides a cone-shaped device which partially opens when a receiver in the device receives a signal from a collar on a pet. There is no ability to automatically refill the food bowl. Also, since only a small triangular opening is provided for feeding, it is possible that the animal will get its head stuck in the device, and the animal is unlikely to want to return to such a device, as suggested by Lewis et al., supra, (Col. 10, lines 37-45).

Lewis et al., on the other hand, provides at least one refrigerated dish of food accessible to an animal via a pair of movable doors, and relies on RF technology through a pet collar. Again, there is no way to automatically replenish the food in each dish, after the animal has eaten. Also, the system is rather complicated in having a plurality of solenoids, doors, cold plates, etc. Further, in order to feed a plurality of animals, a corresponding plurality of feeding devices appears required. Col. 6, lines 49-60 and Cols. 8 and 9.

Matsuura et al., U.S. Pat. No. 6,044,795, shows an animal tag having a memory for pre-storing a history of the animal feeding times. The device samples the tag every 10 minutes or so and, if the animal is present, the food is dispensed to a separate dish. Again, the food is exposed once dispensed, so it is available for other animals or children to gain access thereto. This device also appears rather complicated, especially when it is considered that it can only feed one animal. Further, by requiring the tag to have a memory, the cost increases.

Thus, there remains a need for a simplified technique of controlling access by a plurality of animals to food, which is relatively cost-effective, can prevent overeating and is therefore more healthy, easy to use and clean, avoids shocks, is relatively less complex in regard to its use and operation, does not leave food exposed for other animals and possibly children to gain access, can regulate both the amount of food made available and the duration of time in which it is available, and which can automatically refill the food on a regular schedule, after each feeding.

SUMMARY OF THE INVENTION

Accordingly, it is a purpose of the present invention to provide a device and related method for automatically feeding an animal.

It is another purpose of the present invention to provide a programmable automatic pet feeder capable of controlling which of a plurality of pets has access to the feeder, how much food is dispensed to each pet, and how often the pet(s) can eat.

It is another purpose of the present invention to provide a device and related method for more reliably automatically feeding an animal its proscribed diet and preventing other animals from eating same.

It is still another purpose to provide an automatic pet feeding device having a retractable food dish, wherein the user can manually cause the extension or withdrawal of the dish, when desired.

It is another purpose of the present invention to provide a device and related method which rely upon a specific radio-frequency tag associated with each animal to control the automatic feeding of each animal, respectively.

Moreover, it is a purpose of the present invention to provide a device and method for more reliably and automatically feeding cats, dogs other domestic and exotic animals a required diet.

It is also a purpose of the present invention to provide a device and method capable of automatically maintaining specific amounts of food per feeding, as well as the overall amount of food made available to a pet during a period of time.

It is also a purpose to provide a device and method for automatically feeding an animal that are easy to use, and allow the user to feed animals inside or outside, even in the presence of other undesirable animals.

It is also a purpose to provide a convenient and healthy device and method for controlled feeding (type of food, amount of food, frequency of feeding, amount of the feeding at any one time) of one or more pets.

The present invention is an intelligent food delivery device that is able to wirelessly identify pets and control the access, frequency and amount of food available to each pet as programmed in the dispensing unit. This is vital in regulation of good health as well as treatment of health issues commonly found in single and multiple pet households such as obesity, diabetes, and kidney disease.

The invention includes a drawer which is moved into a position accessible to a pet only when an ID tag on the pet is in the vicinity of the feeder, and the tag is recognized via radio frequency as a valid, pre-stored tag. When the valid ID tag is identified, the drawer is opened to allow the pet access to a dish filled with food. The pet is thus provided with the appropriate amount of food for a prescribed time period. However, the drawer will not open if access is denied (i.e., the pet's tag is not recognized as valid) or two or more cats are present, each with a "valid" tag.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
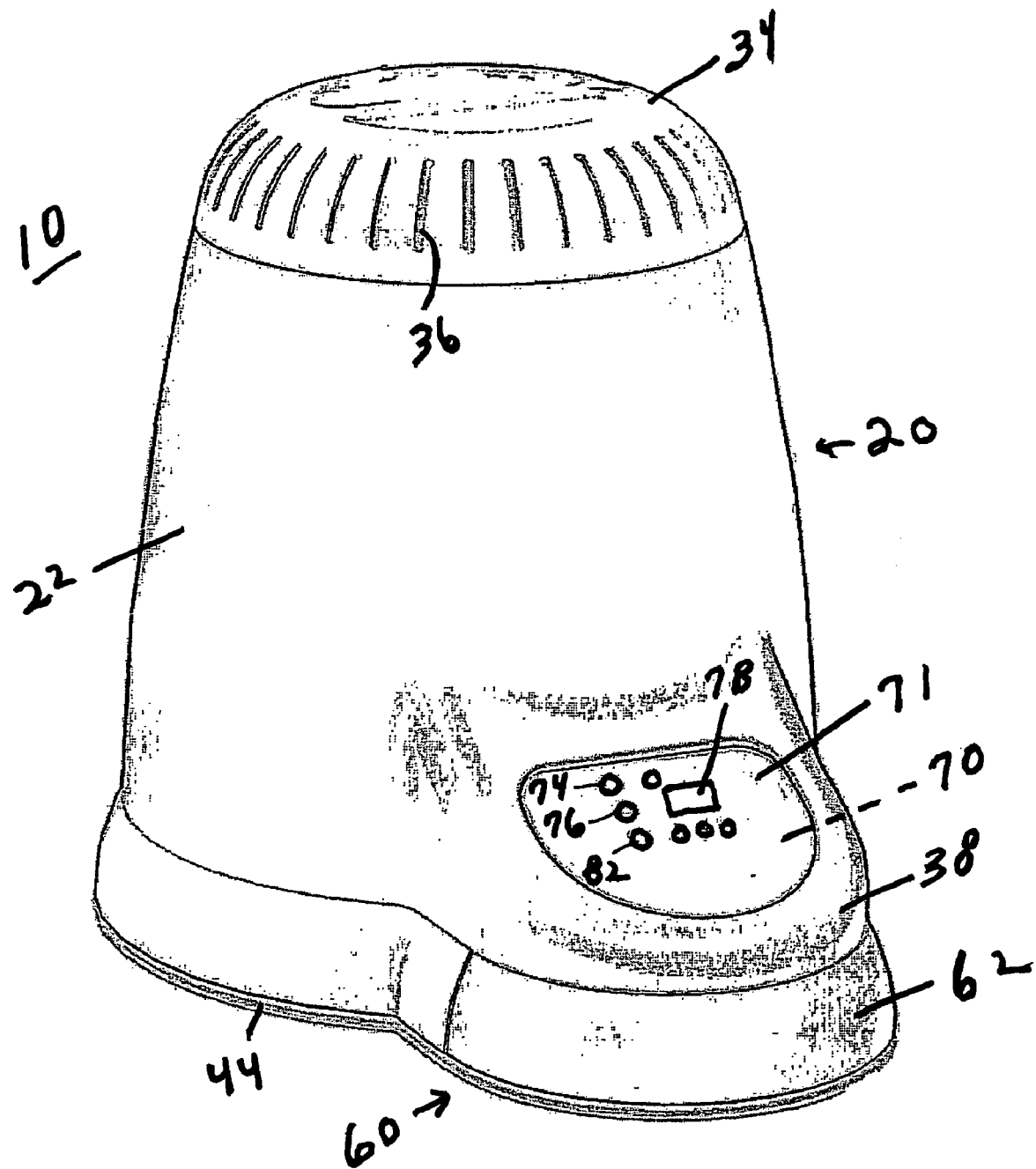
FIG. 1 is a perspective view of an automatic animal feeding device according to the present invention with a feeding drawer in the closed position.
Figure 2:
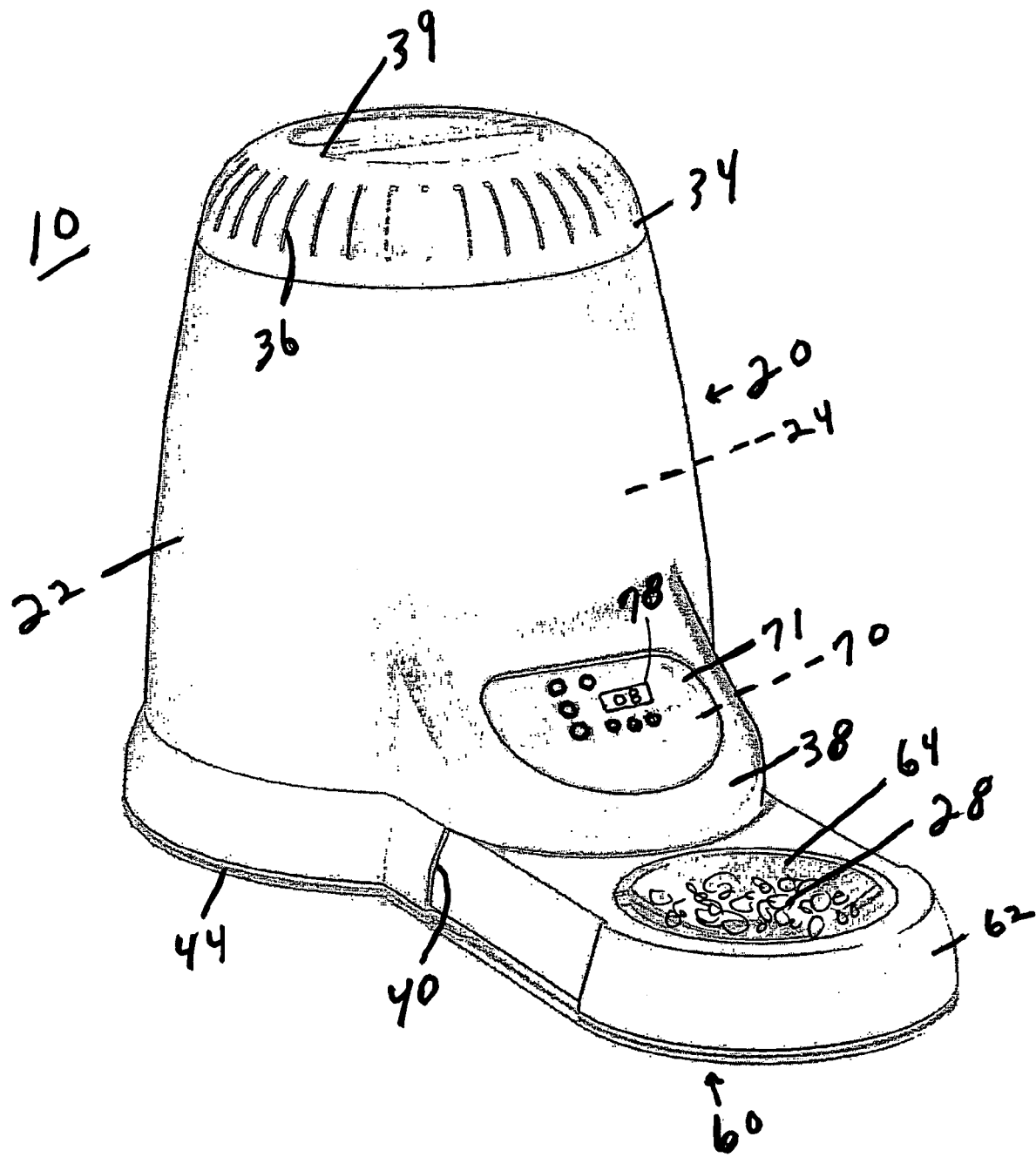
FIG. 2 is perspective view of an automatic animal feeding device according to the present invention with a feeding drawer in the open position.

Various embodiments of the present invention will now be described in detail with reference to FIGS. 1-7.

The present invention is an automated feeding system, and most particularly a feeding device and method for pets with specific diets. The specific diet can be any type of food whether grocery store brand, prescription or home made.

The system allows a pet owner to control the feeding of the specific diets through identification of specific pets and their individual diets, as pre-determined and programmed by the owner. More particularly, the device and method can maintain specific amounts of food per feeding, regulates the overall amount of food made available, and can control the time in which the food is made available. The invention can also prohibit other pets from feeding during a programmed feeding of time of another pet.

More particularly, the present invention is directed to a programmable automatic pet feeding device 10 capable of controlling which pet has access to food dispensed by the device 10, how much food is dispensed to each pet, and when the food is dispensed. While there is described below an exemplary device and method for use with cat feeding, the present invention is not limited to use with cats, as other animals, can also benefit from the invention.

As seen in FIGS. 1-5, the present invention generally includes a housing 20, a food dispensing mechanism 50, a feeding mechanism 60, and a control panel or user interface 70.

The housing 20 is preferably injection-molded from plastic for ease of manufacture, relative low cost, and ease of cleaning during use. The housing 20 should have smooth surfaces so as not to provide any area for injury to a pet which has been left unattended. In addition to providing structure to the device 10, the housing protects the components which are inside the housing 20, as described below.

The housing 20 includes generally a body 22 which is substantially hollow. The housing 20 should have a relatively low center of gravity to help prevent a pet from knocking the device 10 on its side. In this regard, the housing 20 includes a base plate 44 to cover the bottom thereof, and thus the components inside the housing 20. The base plate 44 is preferably weighted metal to promote heaviness and a low center of gravity for the device 10. The base plate 44 also provides a substantial mount for a bracket 46 that supports various internal components of the housing 20, as also described below.

Further, it is preferred that the base plate 44 have rubber or like feet 45 to raise the device 10 off a support surface, such as a floor. These feet 45 promote stability of the device 10 on uneven surfaces, allow the device to be reliably used on carpet or other irregular surfaces, and space the drawer 62 above the support surface to allow for unobstructed opening and closing.

Received within a first upper opening 23 of the body 22 is a food storage container in the shape of a hopper or funnel 24. The hopper 24 is preferably molded of plastic to include a first, open end 26 in which food 28 is introduced by the pet owner. The hopper 24 preferably holds about 3-4 lbs of food which should last about 2 weeks for a small animal. The hopper 24 can be removed from the housing 20 to facilitate cleaning.

The hopper 24 serves to funnel the food 28 to an auger described below. To facilitate the funneling, the hopper 24 is tapered to allow gravity to feed the food 28 towards the bottom thereof. At a second opposite bottom end 30 of the hopper 24 there is formed a dispensing orifice 32 to allow the food 28 in the hopper 24 to exit the body 22. As an alternate to mere gravity feed, the device 10 can use a mechanism (not shown) to gently vibrate the hopper 24 to facilitate movement of the food toward and out the orifice, however, this would raise the cost and complexity of the device.

The housing 20 also includes a lid 34 to cover the first, open end 26 of the hopper 24. Preferably the lid 34 is a molded of plastic. The lid can be opaque, or it can be transparent so that the pet owner can see how much food is left in the hopper 24. The lid 34 can include openings 36 therein to allow air to circulate in the hopper 24 to help the food 28 stay fresher longer, and also to allow the smell of the food 28 to emit from the hopper 24, thereby attracting the animal toward the device 10. The lid 34 should be pressure/interference fit so that it can be easily removed by the pet owner by grasping and turning the handle 39, but not removed by a pet.

Of course, the preferred food 28 when the device is used for a housecat feeding is dry cat food, which should move well in the hopper 24 and along the dispensing mechanism 50 described below. In addition to the food 28, it may be possible to disperse a pet's medicine throughout the hopper 24 of food 28, so that the medicine is dispensed regularly with the animal's diet.

The housing 20 also can include an extension 38 to contain a drawer 62 and the control panel 70 as described below. Within the extension 38 there is formed an opening 40 in which the drawer 62 slides between a first position inside the housing 20 and a second position outside the housing 20. The drawer 62 is also preferably formed of plastic and may include ribbing (not shown) around a dish 64 to urge food into the dish 64 when the drawer 62 moves to the second, closed position.

The drawer 62 receives the dish 64, which is preferably made of stainless steel or glass. An outer peripheral lip 61 on the dish 64 can engage by pressure/interference fit an inner edge of an opening 63 in the drawer 62 to prevent the animal from removing the dish 64 from the device 10, and to prevent the dish 64 from being dislodged from the drawer 62 when the drawer 62 moves relative to the device 10. Nevertheless, the user can remove the dish 64 from the drawer 62 by pushing up from the bottom of the dish 64 when the drawer 62 is opened, i.e., after the user presses the drawer open/close button 74 described below. The upper surface of the dish 64 is preferably flush with the top 65 of the drawer 62, also to facilitate unhindered movement of the drawer 62 in the device.

The dish 64 is shown as having a typical bowl shape. In an alternate embodiment (shown in phantom in FIG. 4), however, the dish 64 can be a square cross section with a flat bottom to help spread out the food as it is dispensed from the hopper 24, and therefore help insure unencumbered movement (i.e., without food getting caught) of the drawer 62 relative to the device 10.

When the drawer 62 is in the second outside position, the dish 64 with food 28 therein is accessible to the animal for feeding. The dish 64 is also easily accessible by the pet owner for inspection, removal and cleaning.

The dish 64 preferably is capable of receiving a ⅛ cup serving of food 28. In this regard, preferably the user can determine how much food is fed per day by varying the total number of ⅛ cup feedings, but not the amount of each feeding. The size of the portion, i.e., ⅛ cup, is chosen for this embodiment because that is approximately the amount of food that a cat would likely eat in one sitting without leaving excess in the bowl 64. For larger animals, the dish can be made bigger or the frequency of feedings can be increased.

The housing 20 also includes a power supply 42 to operate the various motors, limit switches and processor described below. The power supply 42 includes an AC adapter, i.e., an AC transformer 43 (FIG. 7) that provides low voltage(s) and current rating(s) for the device 10 to operate safely, as would be known in the art.

While not shown, the device 10 can also rely on battery power, e.g., a 9 volt battery, to maintain a clock in the processor 96 and to keep the program described below in the processor 96 memory during a temporary power interruption.

The dispensing mechanism 50, which is attached to the bracket 46, includes an auger tube 52, a first end 54 of which receives the orifice 32, and therefore is put into fluid communication with the food 28 exiting the hopper 24, and a second end 56 of which opens to the dish 64. The auger tube 52 is also preferably formed of plastic.

Figure 4:
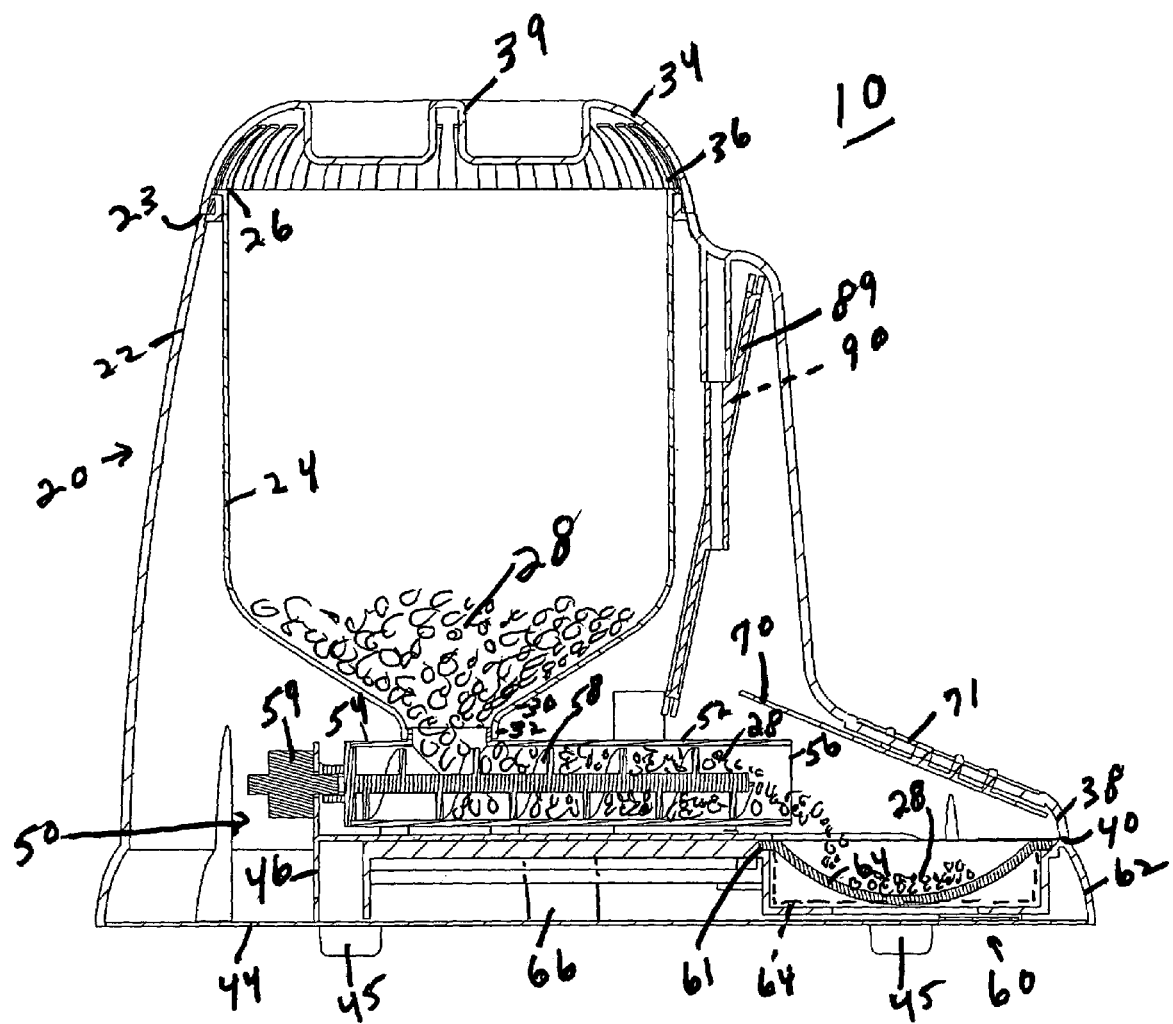
FIG. 4 is a side, cross-sectional view of the feeding device according to an embodiment of the present invention.
Figure 5:
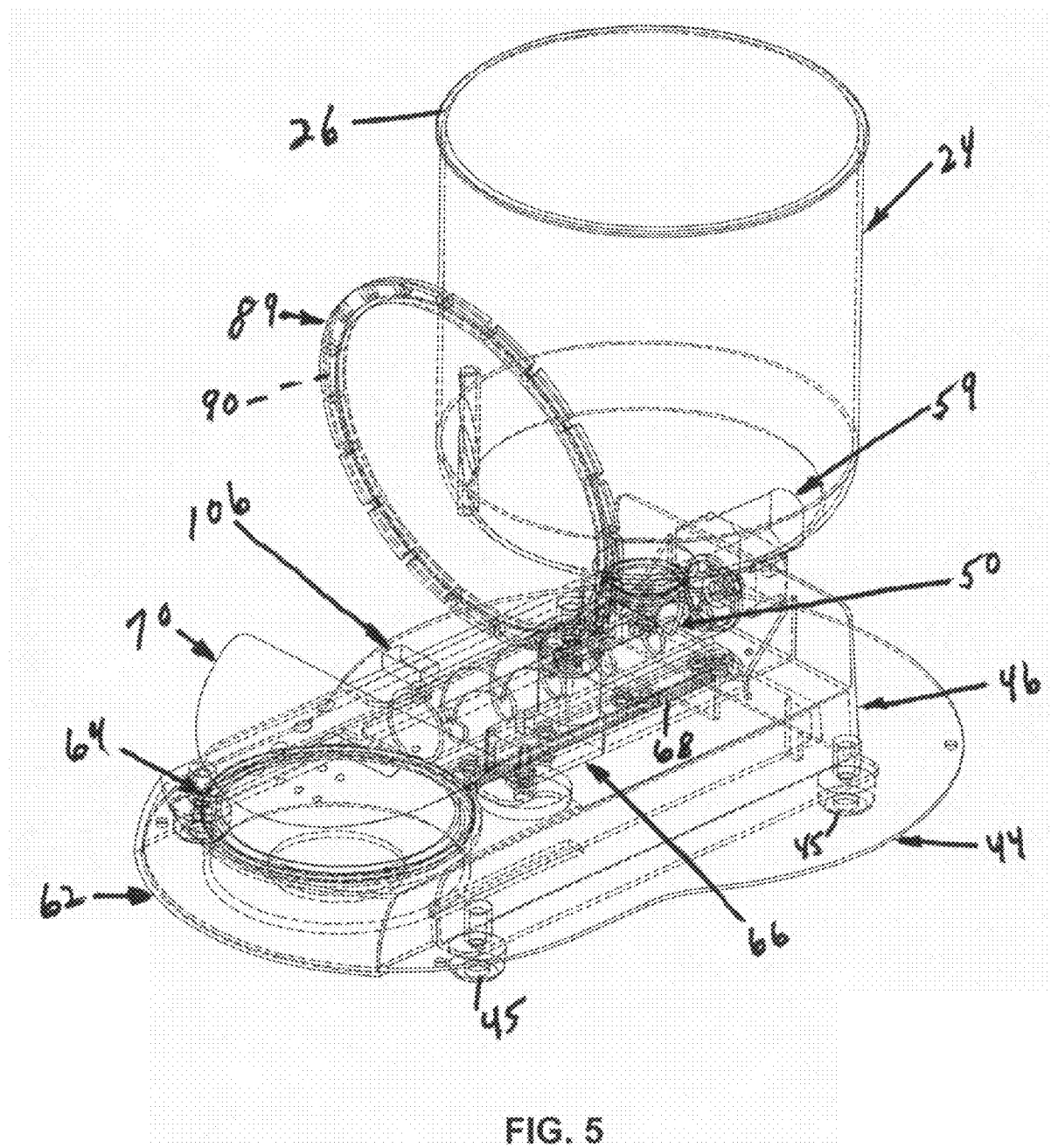
FIG. 5 is a perspective view of the interior components of the device according to an embodiment of the present invention.

The auger tube 52 houses an auger 58 which can also be formed of plastic. The auger 58 is driven by a stepper motor 59 so as to push the food 28 into the dish 64. That is, when a command is given to fill the dish 64, as described below, and when the drawer 62 is in the first, closed position as shown in FIGS. 1 and 4, the auger 58 is driven by the motor 59 to direct the food 28 from the orifice 32, through the auger tube 54, and into the dish 64 on the drawer 62.

The feeding mechanism 60 is also connected to the bracket 46. The drawer 62 of the feeding mechanism 60 is connected to a DC motor 66 via a screw shaft 68 to allow the rotational force of the drawer motor 66 to be translated into a drawer 62 opening and closing function, shown in FIGS. 1 and 2, and 3 and 4, respectively.

On the top of the extension 38 of the housing 20 there is located the control panel 70 to be used by the pet owner to operate/monitor the device 10. This control panel 70 is located under a cover 71 fixed to the housing 20. The cover 71 include graphics for the buttons and LED's discussed below, including the words OPEN/CLOSE, POWER, FEEDINGS, PROGRAM, and TAG 1, TAG 2 and TAG 3.

Figure 3:
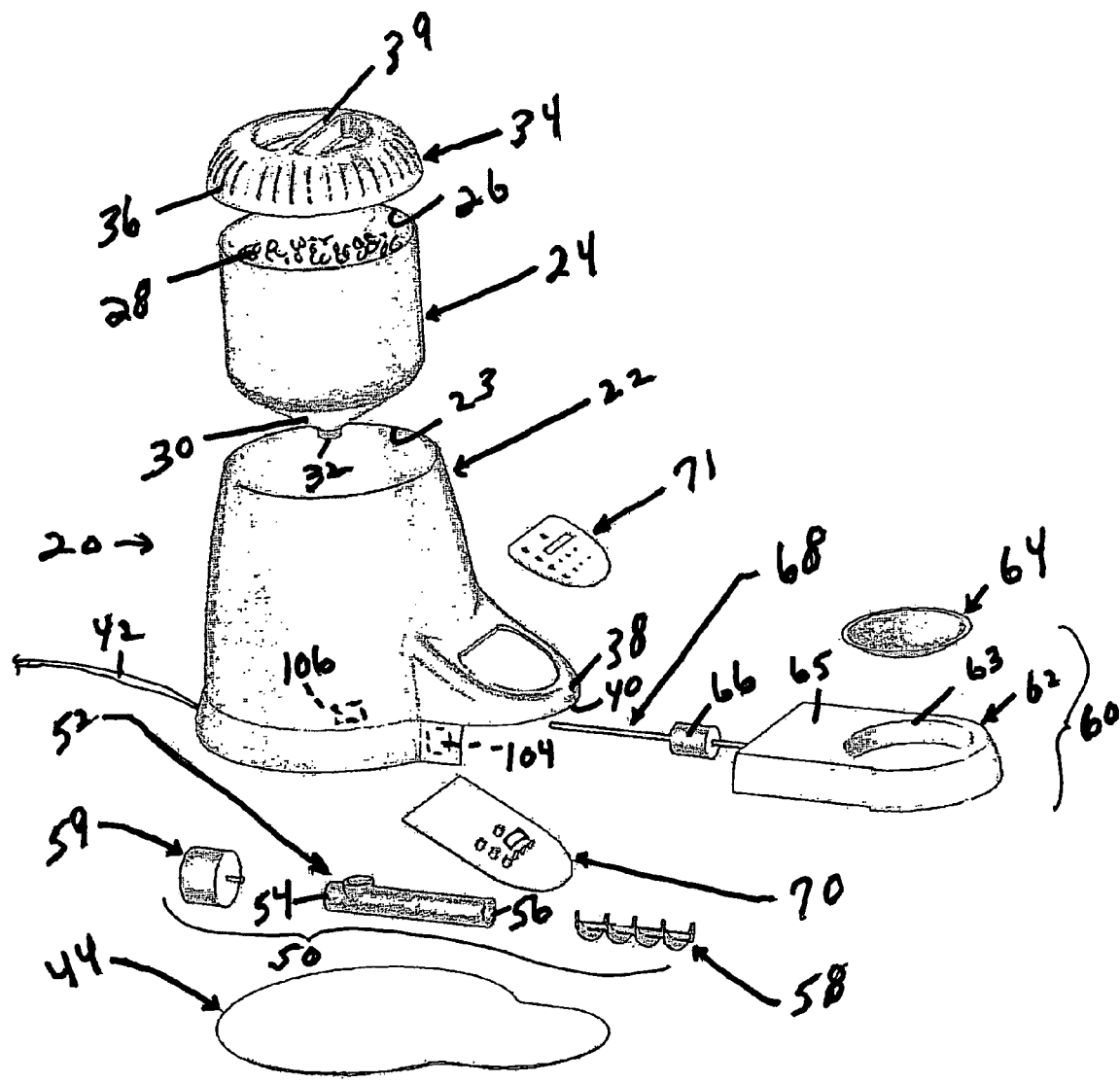
FIG. 3 is an exploded view of the feeding device according to an embodiment of the present invention.
Figure 6:
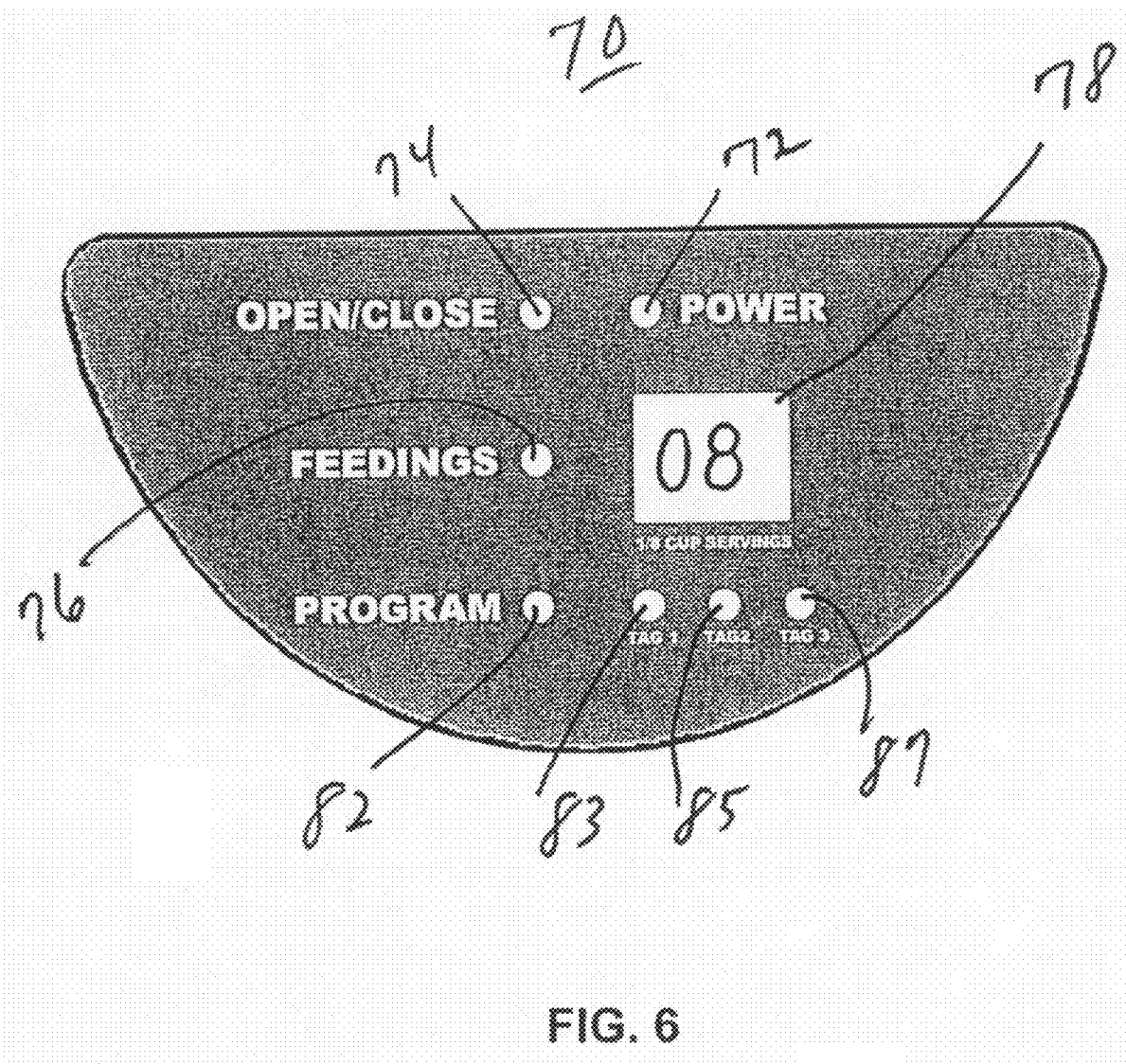
FIG. 6 is a plan view of the control panel according to an embodiment of the present invention.

As shown in FIGS. 3 and 6, the control panel 70 is a printed circuit board that includes the buttons and lights for providing input and indicia for the user, and a processor 96 for processing and storing the input, receiving feedback, such as the reception of a valid, adjacent ID tag, and controlling operation of the device 10, including a timer and the feeding/dispensing mechanisms 50/60.

The control panel 70 preferably includes the components as shown in FIG. 1:

1 Green LED 72 to show power is on (once the power supply 42 is plugged in);

1 button 74 to "manually" open and close the drawer 64 so that the pet owner can confirm the food 28 has been eaten by the pet, and/or clean the dish 64 (this open/close button 74 must be both pushed and held to prevent accidental openings);

1 button 76 to select the number of feedings per pet/tag per day (during operation, the user can also check on the number of portions of food assigned to each tag, when desired);

a 2-digit numeric display 78 indicating the number of feedings per pet per day that has been set using the Feedings button 76 (as noted above, each feeding is preferably about ⅛ cup);

1 button 82 to enter and exit the "Program" mode, which is used to define if a tag is accepted or rejected by the device 10; and 3 LED's 83, 85 and 87 corresponding to three tags.

While it is possible to incorporate the controls of the control panel 70 in a remote control device, using, e.g., infrared technology, same is not believed necessary or cost-effective since the device does not require much user interface once it is programmed.

The housing 20 also includes a reader antenna 90 in an antenna housing 89 which operates in conjunction with a radio frequency identification (ID) tag 100 described below, to wirelessly read a tag that comes into its field. The antenna 90 can be placed, e.g., above the control panel 70, as shown in FIG. 4.

Alternatively, depending upon the range or field desired, the antenna 90 can be placed, e.g., around the bowl 64 in the drawer 62 so that the field actually moves with the drawer 62. Still further, the antenna 90 could be placed in a mat that is separate from the housing 20 and is placed in front of the housing 20. Overall, the antenna should be toward the front of the device for improved range.

As known in the radio frequency field, the antenna 90 generates an excitation field to power the ID tag 100. That is, the antenna 90 is basically a coil of wire with a tuning capacitor. In a preferred embodiment, the antenna 90 has a capacitance of 47 nF, a radius of 3.23 cm, a length of 0.46 cm, and the number of windings is 11.75. The antenna 90 can be tuned so that it resonates preferably at about 134.2 kHz, otherwise the read distance of the ID tag 100 will be significantly reduced. If it desired to expand the field in which a valid tag 100 is detected, a second antenna, or a more sensitive antenna can be used.

The housing 20 can also incorporate limit switches 104, 106, as described below.

Figure 7:
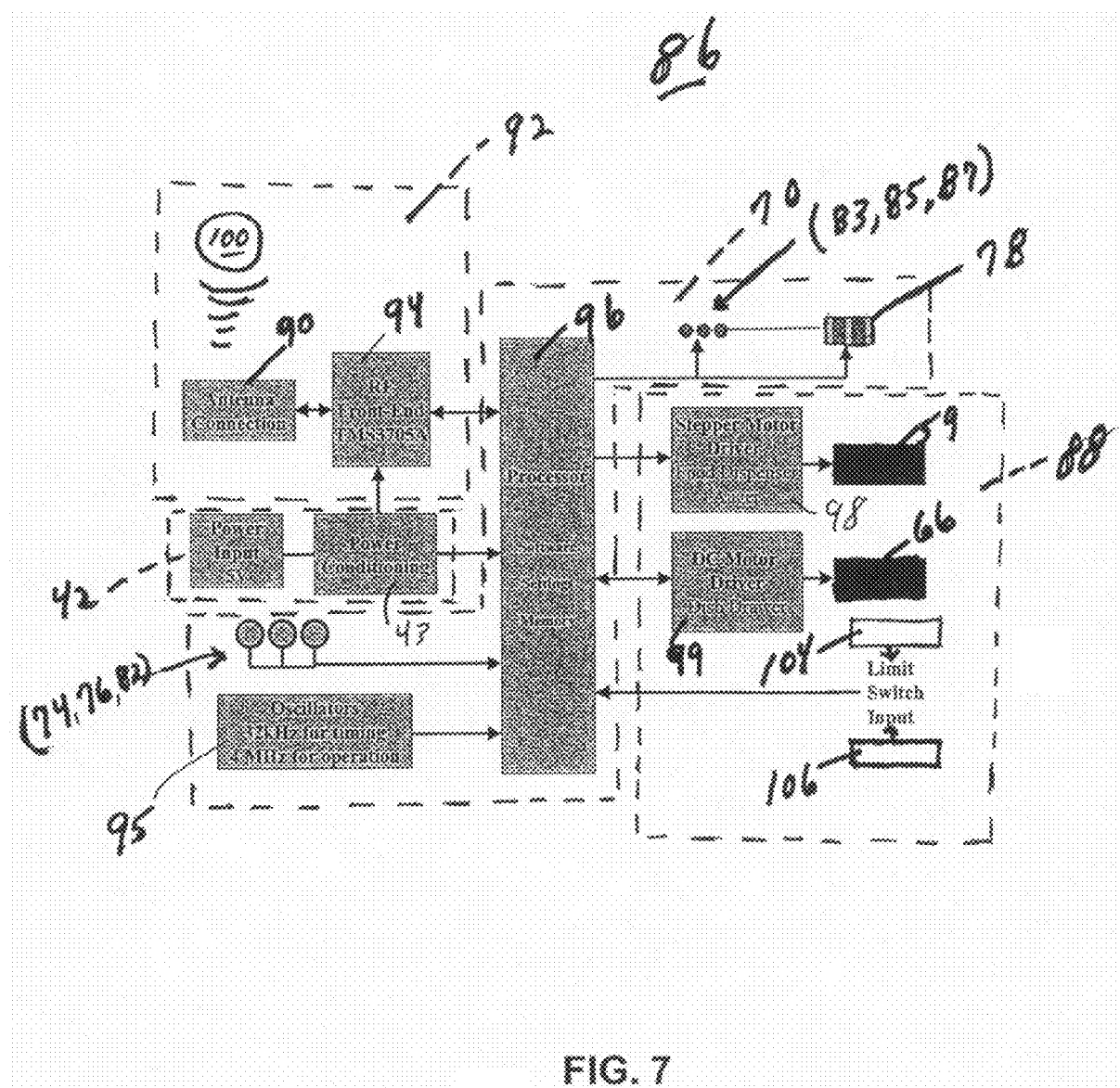
FIG. 7 is a schematic diagram of the electrical components according to an embodiment of the present invention.

FIG. 7 shows an embodiment of the control system 86 according to the present invention, including generally, the power supply 42, the control panel 70, the dispensing mechanism 50/feeding mechanism 60 electrical components 88, and an RFID subsystem 92.

The power supply 42, working through the transformer 43, supplies power to the RF front end 94, antenna 90 and processor 96. When powered, the antenna 90 is capable of exciting an adjacent tag 100. When a tag 100 is excited and detected by the antenna 90, a signal is sent to the processor 96 via the RF front end 94.

As also shown in FIG. 7, the four buttons 74, 76, 80 and 82, when activated, send their signals to the processor 96. Further, oscillators 95 input signals to the processor 96 (32 kHz for the time of day clock, and at 4 mHz for the RFID chip).

The processor 96 controls a dispensing mechanism driver 98 to drive the auger stepper motor 59, and a feeding mechanism driver 99 to drive the drawer DC motor 66. Such devices can be obtained from, e.g., Fairchild Semiconductor. The limit switches 104 and 106 control the opening and closing limits of the drawer 64 by sending their signals to the processor 96 to terminate movement of the drawer 64.

The processor 96 can be obtained from the Atmel company, e.g., #ATMEGA162-16AI. The processor 96 can be an Atmel 8 bit, AVR micro-controller containing internal timers for accurately measuring food-dispensing intervals, an S-Ram, program flash memory, EEPROM for non-volatile storage of the current program settings and the software used to control the user interface, auger and drawer motors and RFID circuitry.

The processor 96 also controls and outputs to the numeric display 78 and the 3 LEDs 83, 85 and 87.

The RFID subsystem 92 includes the ID Tag 100, the reader antenna 90 and an RF front-end 92. The RF front end 92 is a radio frequency device that facilitates communication between the antenna 90 and the processor 96.

The ID tag 100 is a known plastic disc that is worn on the pet's collar. Unlike the tag of the above-discussed Matsuura et al., U.S. Pat. No. 6,044,795, which has its own memory for pre-storing a history of the animal feeding times, the tag of the present invention does not have a memory. The tag 100 only identifies which animal is present.

There are several manufacturers of these RFID components, including Texas Instruments, and Phillips Semiconductor. These companies offer products operating at frequencies of 125/134 kHz and/or 13.56 mHz.

The ID tag 100 does not require a battery, but derives its power from the excitation field created by the antenna 90 at the housing 20. When exited or polled, i.e., when the ID tag 100 is located within about a foot from the reader antenna 90, the ID tag 100 transmits an ID number to the antenna 90.

The present invention also relates to a method for automatically feeding pets with special diets. In one embodiment, the device is capable of identifying three different animals, but other numbers are contemplated by the invention. Three is merely a number which is likely to cover the needs of most pet households, and there is a practical limit on a single machine to accommodate the spaced time feedings of a plurality of animals, since each encounters a waiting period between feedings, as described below. However, the dish 64 will only be accessible via the open drawer 62 when a single "valid" pet tag is within range of the device.

User Interface

Power On

After power up, i.e., once the device 10 has been plugged in, the device 10 is in Normal operating mode. The power on LED 72 blinks about once per second.

Manual Open/Close

As noted above, the user of the device may "manually" open and close the drawer to, e.g., confirm the food has been eaten by the pet, and/or clean the dish 64. To do this, the user presses button 74 on the control panel 70 which causes the processor 96 to command the feeding mechanism 60 to open the drawer 64. The limit switches 104, 106 provide feedback to the processor 96 to define the first and second extreme positions of the drawer 62. The Normal operating mode described below is suspended while the drawer 64 is open, but the timer (which regulates when an animal can gain access to food) is still running, if an animal has activated its feeding sequence. When the user no longer needs the drawer 62 open, the user re-presses the button 74 to close the drawer 62.

Feedings

The user presses button 76 to review on the numeric display 78 the feeding settings (# of feedings in a 24 hour period) for each tag that has been pre-programmed, if any.

Using this button, the pet owner can set the maximum number of times food will be dispensed per day for each valid ID tag 100, 100', 100". In one embodiment, the user can choose from 1 to 12⅛ cup servings per day for each pet. For example, the user can chose eight total ⅛ cup servings per day, totaling 1 cup of food for the pet for the 24 hour period, for a first animal, ten for a second and twelve for a third. The food dispensing timer starts when each pet receives its first dispensing of food.

Programming Tags for Recognition

The user presses and holds the Program button 82 for about 2 seconds to enter Program mode. One of the three LED's 83, 85, 87 will be flashing to indicate the unit is in Program mode. The LED will flash Green if it is already programmed for recognition of a tag or the LED will flash Red if it hasn't been programmed for a tag.

For example, if the first Program LED 83 is Red, the user can place a tag 100 in the antenna 90 field, the system 86 will read the tag's serial number, and the LED 83 will change to Green. After this happens, the number of feedings can be adjusted using the Feedings button 76, again, e.g., eight for the first animal with tag 100. The display 78 will be lit indicating the number of feedings set, i.e., 08. This tag 100 can then be placed on a pet and when the pet enters the field of the device 10 with the tag 100 thereon, the feeding schedule in the processor 96 memory is carried out for that pre-programmed tag 100.

The user then presses the Program button 82 again to cycle to a second tag 100' (LED 85) and repeats the same programming for tag 100' so that it is authorized for ten servings in a twenty-four hour period. The user again presses the Program button 82 to cycle to a third tag 100" (LED 87) and repeats programming for tag 100" for twelve servings. The tags 100' and 100" can also be placed on animals, e.g., on the collars, and their presence at the device 10 will result in their respective stored feeding regimens.

The user then presses the Program button 82 to return to the Normal operating mode, which is always halted while in the Program mode. Therefore, it is important for the user to cycle back to the Normal operating mode by pressing the Program button 82.

Normal Operating Mode (Pet Detection and Feeding)

In this mode, as noted above, the power on LED 72 will flash once per second to indicate the device is operational.

When a tag 100 on a pet is in range of the device 10, the tag 100 will be excited and read by the antenna 90. If the tag 100 is recognized as valid by the processor 96, and if the tag 100 has feedings remaining for that day, the processor 96 instructs the hopper 24 to dispense the ⅛ cup of food 28 and the drawer 62 opens to allow the animal access to the food 28. The corresponding LED, i.e., 83, will flash Red/Green. The drawer will stay open for a preset period of time, e.g. 5 minutes. During this time, the antenna 90 sends out periodic excitation to continue to check if the "valid" tag 100 is still present at the device.

The pet wearing the valid tag 100 will have a full 15 minute lock (as controlled by the timer in the processor 96) on the dish 64 and no other tags (i.e., 100' and 100" which are pre-programmed as authorized) will be considered valid until the 15 minutes have expired.

As an alternative, the processor 96 can control the antenna to periodically seek to excite the tag of the pet that began the feeding cycle. If no signal is returned by the tag, the animal wearing the tag has left the field of the device, and the drawer 62 can be closed to prevent other, non-tagged animals from eating the food.

If during the 15 minute eating period another pet with an invalid or valid tag comes into the range of the antenna 90, the drawer 62 will be ordered closed by the processor 96. More particularly, RFID technology allows for compensation of transmission collisions which occur when more than one tag 100, 100' and/or 100" is in the read range of the device 10. That is, the collision of the responses from each tag generates a NULL read, which closes the drawer 64.

After the 15 minutes have expired, the drawer 62 closes, i.e., the timer signals the processor 96 to operate the drawer motor 66. The drawer 64 then moves from the second, extended position to the first, internal position. Thereafter, the tag 100 will not be allowed to open the drawer for a 45 minute wait period.

It is also to be noted that tags can be recognized by the device and yet not considered authorized. Thus, if a household has two such devices 10, and tags A, B and C are pre-programmed as authorized for a first device X and C, D and E for a second device Y, if the drawer of the first device X is open due to the presence of a pet wearing a tag A, and if a pet with a tag D comes into the field of the first device X, the first device X will detect the tag D, but will not recognize the tag D as being authorized and therefore will close the drawer to prevent the animal with tag D from gaining access to the food of the animal with tag A.

The animal may return to the device 10 as many times during the drawer opening time period of 15 minutes as it likes to finish eating the first dispensing of food 28, but it will not receive more than the pre-programmed amount of food 28 until an hour has passed. That is, after the 15 minute eating period, the drawer 62 closes and that first pet with the valid tag 100 will not be allowed to open the drawer 62 for another 45 minutes. Thus, the animal must wait at least 45 minutes for its next feeding. In light of the above, an authorized pet can approach the device anytime during a 24 hour period to begin the feeding cycle, but is fed only 15 minutes per hour, and only up to the total feedings pre-programmed for the 24 hour period.

In summary, when an authorized animal first encounters the device 10, the drawer will open for five minutes and, if the animal remains and no other tags appear, the drawer will stay open for the full 15 minutes. At the end of the 15 minutes, the drawer closes, and this fed animal must wait at least 45 minutes before the drawer 62 will open again for it. Should this first animal consecutively access the device every hour, and if the animal's tag 100 has been pre-programmed for 8 feedings in a twenty-four hour period, after the first eight hours, the animal's tag 100 will not be able to result in the opening of the drawer again; the animal must wait until the twenty-four hours is up to start the process of 8 new available feedings during the next 24 hours.

Of course, at any time during the first animal's twenty-four hour feeding cycle, either of the other two pets whose tags 100' and 100", respectively, have been pre-programmed to be recognized as authorized to feed, may gain access to the food. For example, if the first animal's tag 100 results in the opening of the drawer 62 for fifteen minutes, that animal cannot open the drawer 62 for another 45 minutes at a minimum. However, if roughly at the beginning of this 45 minute wait for the first animal (tag 100), the second animal (with tag 100') comes within the field of the antenna 90, the processor 96 recognizes the tag 100' as authorized and opens the drawer 62 for at least the 5 minute period. If the second animal is present for the five minutes, and if another tagged animal does not come into the field, the second animal can feed for 15 minutes. Once the fifteen minutes have elapsed, the drawer closes and the second animal must wait 45 minutes until he can feed again. This second animal may have been programmed for a total of 10 feedings per day, so this second animal can return to the device nine more times and be fed, as long as each 45 minute wait period for that animal elapses. During the overlapping 45 minute wait periods of the first and second animals in this example, the third animal (with the validated tag 100") can come into the field and cause the drawer to open for the fifteen minutes, again followed by the 45 minute wait period. If this third animal is programmed for 12 feedings, it can return to the device 11 more times in the twenty-four hour period.

Removal of a Programmed Tag

The user presses and holds the Program button 82, as described above, to enter the program mode. The user presses the Program button 82 again to select, e.g., tag 100' or tag 100". Once the corresponding LED 85 or 87 is flashing, the user presses and holds the Open/Close button 74 and the LED 85/87, respectively, will switch from Green to Red. This procedure allows, e.g., the user to remove programming for lost tags.

The foregoing is considered illustrative only of the principles of the invention. Further, since numerous modifications and changes will readily occur to those skilled in the art, it is not desired to limit the invention to the exact construction and operation shown and described. For example, while the present invention's size and portions is most suitable for a small pet, like a cat, other sizes and portions can be used to feed other animals. Accordingly, all suitable modifications and equivalents may be resorted to that fall within the scope of the invention and the appended claims.

What is claimed is:

1. An animal feeding device, comprising:
    a housing including a drawer movable between a first position inside the housing and a second position outside the housing;
    a device for supplying food in the housing to the drawer in the first position;
    a radio frequency receiver;
    a radio frequency transmitter worn by an animal to send a signal to the receiver; and
    a controller, which receives confirmation from the receiver that a signal has been detected from an authorized transmitter which moves the drawer into the second position, and which can distinguish between the signal detected from the authorized transmitter and a signal detected from an unauthorized transmitter.

2. The device as recited in claim 1, wherein, when the signal from the unauthorized transmitter is detected, the controller does not move the drawer into the second position to the first position.

3. The device as recited in claim 1, wherein, when the signal from the unauthorized transmittal is detected, the controller moves the drawer from the second position to the first position.

4. The device as recited in claim 1, wherein the controller includes a timer for limiting an amount of time the drawer stays in the second position.

5. The device as recited in claim 4, wherein the controller confirms that the authorized transmitter is sending a second signal to the receiver and, if not, moves the drawer from the second position to the first position for a second period of time.

6. The device as recited in claim 1, wherein the radio frequency receiver is in the housing.

7. The device as recited in claim 1, wherein the radio frequency receiver is located outside the housing.

8. The device as recited in claim 1, wherein the housing further comprises:

first and second openings;
    a hopper having a first open end at the first opening and a second open end; and
    the drawer is movable within the second opening.

9. The device as recited in claim 8, further comprising a dish removably mounted on the drawer.

10. The device as recited in claim 9, wherein the device for supplying the food comprises an auger extending between the hopper and the dish.

11. The device as recited in claim 10, wherein the controller causes the auger to supply food to the dish when a first authorized transmitter is recognized by the receiver.

12. The device as recited in claim 8, further comprising a removable lid covering the first open end of the hopper to allow the hopper to be filled with food by the user.

13. The device as recited in claim 1, wherein the controller discriminates between a plurality of authorized transmitters, wherein only one authorized transmitter is given access to the food for a period of time.

14. The device as recited in claim 1, wherein, when the receiver receives a signal from more than one authorized transmitter, the controller moves the drawer into the first position.

15. The device as recited in claim 1, wherein the housing further comprises a control panel to allow the user to authorize a plurality of transmitters.

16. The device as recited in claim 15, wherein the control panel includes a control for moving the drawer from the first to the second positions, in the absence of a transmitter.

17. The device as recited in claim 15, wherein the control panel includes an input for setting the number of times the drawer will move to the second position for an authorized transmitter in a predetermined period of time.

18. The device as recited in claim 1, further comprising a sensor to determine when the drawer is in the first position, and when the drawer is in the second position.

19. The device as recited in claim 1, further comprising an AC power supply.

20. The device as recited in claim 1, further comprising a DC power supply.

21. The device as recited in claim 1, further comprising a second radio frequency receiver which increases a range in which a signal is received from the transmitter.

22. A method for automatically feeding, comprising the steps of:
    providing a housing having a drawer movable between a first position in the housing and a second position outside of the housing;
    placing food in the drawer;
    providing a receiver to receive a signal generated by a radio frequency transmitter spaced from the receiver;
    programming a controller to recognize the transmitter as authorized;
    putting the transmitter within a range of the receiver so that the receiver can receive the signal;
    having the receiver signal to the controller that a signal from the transmitter has been received;
    having the controller recognize the transmitter as authorized; and
    moving the drawer from the first position to the second position.

23. The method as recited in claim 22, further comprising the steps of:
    programming a plurality of transmitters to be recognized by the controller as authorized; and allowing the drawer to be moved into the second position in a timed sequence, respectively, by the plurality of transmitters.

24. The method as recited in claim 22, further, comprising the step of:
allowing access to the food to only one transmitter during a pre-set time interval.

25. The method as recited in claim 22, wherein the drawer receives the food at a time when the transmitter is recognized as authorized by the controller.

26. The method as recited in claim 22, further comprising the step of:
moving the drawer from the second position to the first position, if a signal from more than one transmitter is received by the receiver, when the drawer is in the second position.

27. The method as recited in claim 22, further comprising the step of:
controlling movement of the drawer via the controller from the first to the second positions without the use of the transmitter.

28. An animal feeding device, comprising:
a housing including a food dispensing mechanism, a drawer movable between a first position inside the housing and a second position outside the housing, a device for moving food from the food dispensing mechanism to the drawer;
a radio frequency receiver in the housing;
a radio frequency transmitter, spaced from the housing, and worn by an animal to send a signal to the receiver; and
a controller, which receives confirmation from the receiver that a signal has been received from the transmitter, said controller recognizing the transmitter as an authorized transmitter and discriminating between said authorized transmitter, for which the controller moves the drawer into the second position, and an unauthorized transmitter, for which the controller does not move the drawer into the second position, or for which the controller moves the drawer from the second position to the first position,
wherein the housing includes a body having first and second openings,
wherein the food dispensing mechanism includes a hopper in the first opening of the body, said hopper having a first open end and a second open end,
a lid covering the first open end of the hopper,
a dish removably mounted on the drawer for receiving the food, and
the drawer being movable within the second opening of the housing, and
wherein the device for moving the food includes an auger extending between the hopper and the dish, when the drawer is in the first position.

29. A method for automatically feeding an animal, comprising the steps of:
providing a housing having a food dispensing mechanism, a drawer to receive the food, which drawer is movable between a first position in the housing and a second position outside of the housing;
providing a receiver to receive a signal generated by a radio frequency transmitter spaced from the receiver;
programming a controller to recognize the transmitter as authorized;
attaching the transmitter to the animal;
putting the transmitter within a range of the receiver so that the receiver can receive a signal from the transmitter;
having the receiver signal to the controller that a signal from the transmitter has been received;
having the controller recognize the transmitter as authorized;
moving the drawer from the first position to the second position,
wherein the drawer receives the food at a time when the transmitter is recognized as authorized by the controller; and
moving the drawer from the second position to the first position, if a signal from an unauthorized transmitter is received by the receiver, when the drawer is in the second position.

30. The method as recited in claim 29, further comprising the step of:
programming a plurality of transmitters to be recognized by the controller as authorized; and
allowing the drawer to be moved into the second position in a timed sequence, respectively, by the plurality of transmitters, each transmitter being attached to a different animal.

31. The method as recited in claim 29, further, comprising the step of:
allowing access to only one animal to the food during a pre-set time interval.

32. The method as recited in claim 29, further comprising the step of:
allowing the user to control movement of the drawer from the first to the second positions without the use of the transmitter.

* * * * *